Nov. 13, 1923.  
C. STIRN  
HOT FOOD TRAY  
Filed June 9, 1921  
1,473,799
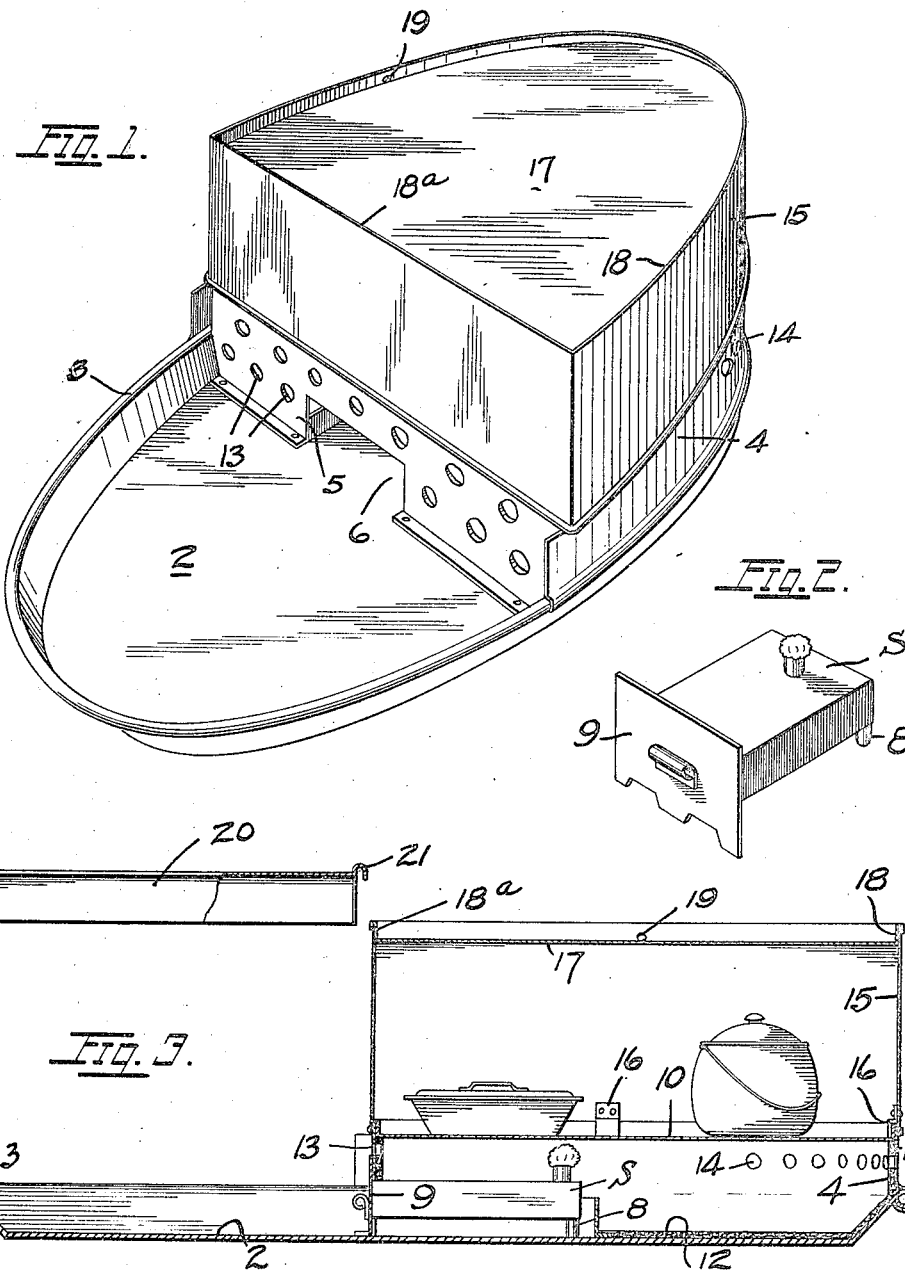
WITNESS  
H. Sherburne
INVENTOR  
Charles Stirn  
BY  
White Prost & Evans  
his ATTORNEYS Patented Nov. 13, 1923.

1,473,799

UNITED STATES PATENT OFFICE.

CHARLES STIRN, OF SAN FRANCISCO, CALIFORNIA.

HOT-FOOD TRAY.

Application filed June 9, 1921. Serial No. 476,367.

*To all whom it may concern:*

Be it known that I, CHARLES STIRN, a subject of the Grand Duchess of Luxemburg, and a resident of the city and county of San Francisco, State of California, have invented a new and useful Hot-Food Tray, of which the following is a specification.

This invention relates to a utensil for the convenient transportation and warming of foods.

It is one of the objects of the present invention to provide a utensil so constructed and arranged as to enable the service of food in a heated condition as, for instance, when the food is to be carried from the kitchen to the person or persons being served as, for instance, in various public institutions, in hotels, camps, railroad cars and passenger vessels, and in various other services.

It is one of the objects of the invention to provide a tray combined with a simple but efficient means for conserving heat generated in any suitable heating unit or device as, for instance, by an alcohol or other lamp or an electric heating instrumentality.

It is another object to provide a tray having a heat conserving or stove-like chamber upon the top of which may be disposed articles to be heated and carried on the tray from place to place and to provide an appropriate cover for protecting the objects disposed upon the carrying portions of the tray. In this connection, it is also an object, to provide area exterior to the heating means for the carrying of such portions of food as it would be preferable to maintain cool and remote from the heating zone.

The invention possesses other objects and features of advantage, some of which, with the foregoing, will be made manifest in the following description of the preferred form of the invention, which is illustrated in the drawings accompanying and forming part of the specification. It is to be understood that it is not intended to limit the invention to the embodiment shown by the said drawings and description, as variations may be adopted within the scope of the invention as set forth in the claims.

Fig. 1 is a perspective of the improved hot-food tray omitting the hood.

Fig. 2 is a perspective of an alcohol lamp adapted to be inserted in the stove chamber of the tray.

Fig. 3 is a central vertical longitudinal section of the tray showing the cover applied and the hood in a position to be applied.

The present invention consists of a hand tray of suitable size but preferably large enough to enable the carrying of a full dinner, the tray being provided with a stove or heating chamber into which there may be arranged any suitable heating device as an alcohol lamp, or oil lamp, or electric heating unit. It is desirable to provide a tray of this kind that may be transported by hand from the kitchen to a location at which the meals may be served and during which transportation, it may be that the articles on the tray are subjected to rain or to a dusty atmosphere and therefore the invention further consists of a cover to be adjustable over the food and the tray also provides an unheated portion for the carrying of articles preferably kept in a cool condition; a hood being provided to be adjusted over the exposed food.

In the preferred embodiment of the invention, a tray 2, here illustrated as of oval shape is employed, and upwardly from its rim 3, there extends a wall 4, of suitable height and length around the margin of the tray, as may be desired, so as to form an unenclosed end portion 4. of the tray. Across this uncovered end portion there extends a transverse front or end wall 5, having at its lower portion an aperture 6, into which may be inserted any suitable heating means as, for instance, an alcohol stove S, the vessel of this stove is preferably elevated above the bottom of the tray as on corner legs 8, so that air may circulate in under the chamber or container and keep the same from overheating. The stove is provided with a front panel 9, adapted to substantially cover the opening 6, in the front wall 5. Upon the top edge of the walls 4 and 5, there is provided a top plate 10, which is recessed somewhat below the plane of the top edge of the walls, thus forming an upstanding lip or flange 11.

This, therefore, provides a rather shallow stove chamber beneath the top 10, so that articles of food and utensils containing food when placed on this top may be maintained in a heated condition when carried from the kitchen on the tray, or the temperature of the foods placed on the top 10, can be raised at the time the food is to be consumed simply by the lighting of the heating stove S, or energization of an electric heating unit if such is employed. To conserve heat within the stove chamber the bottom of the tray and the end and side walls may be covered with asbestos or heat insulating material as shown at 12. In order to support combustion of a flame from a lamp within the heating chamber, the vertical walls may be perforated as at 13 and 14.

Preferably during the transportation of food from place to place on the tray the food is protected from dust and from the rain, if the tray is carried into the open, by means of a cover, comprising a vertical wall 15, having a plane contour approximating the contour of the lip or flange 11, and the cover wall 15, is adapted to telescope down over the outside of this flange with suitable means, as overlapping hooks 16, being provided inside of the cover wall to interlock with the lip 11, and so hold the cover against shifting after it has been applied. If desired, articles of food or other objects can be arranged on the top 17, of the cover, which has an upwardly extending bordering flange 18, to prevent objects from sliding off the cover top 17. To drain off any rain water that may collect on the top 17, the lip 18 is provided with a draining hole or pipe 19, extending outwardly from a portion thereof.

From the above it will be seen that the heating chamber occupies somewhat more than one-half of the area of the tray 2, and the uncovered end portion thereof, thus serves to carry articles of food that are preferably kept cool. To cover or protect articles arranged on the open end of the tray, a removable hood 20, is provided and has hooks 21, at its straight transverse end to match the portion 18ª, of the lip 18. The hood 20, and the cover structure may both be omitted if desired, or only the cover may be applied to the tray when service is not to be made through the open air, at which time the hood 20, need not be used.

While in the construction shown, the vertical wall 4, is shown as attached to the rim 3, of the tray, it is to be understood that a tray may be formed in which the wall would be integral with the upstanding flange of the tray.

What is claimed is:

1. A hand tray having a heating chamber, with a diametrical wall across the tray, means insertable in said wall for heating the chamber, and removable cover means for the tray.

2. A hand tray having a heating chamber at one end, means for heating the chamber, a removable cover for the said chamber, and a removable hood attachable thereto to overhang the other end of the tray.

3. A hand tray having a marginal rim, a wall built upwardly on said rim around one end of the tray, a transverse wall connected to the ends of the rim wall, a top on said walls and forming a heating chamber, a heater insertable into the chamber through the transverse wall; and a deep walled cover applicable to the chamber walls to enclose articles placed on the said top.

In testimony whereof, I have hereunto set my hand.

CHARLES STIRN.